(12) United States Patent
Hirano et al.

(10) Patent No.: US 10,351,438 B2
(45) Date of Patent: Jul. 16, 2019

(54) STANNOUS OXIDE POWDER AND METHOD FOR PRODUCING STANNOUS OXIDE POWDER

(71) Applicant: MITSUBISHI MATERIALS CORPORATION, Tokyo (JP)

(72) Inventors: Hirotaka Hirano, Sanda (JP); Takuma Katase, Sanda (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 88 days.

(21) Appl. No.: 15/539,302

(22) PCT Filed: Feb. 12, 2016

(86) PCT No.: PCT/JP2016/054118
§ 371 (c)(1),
(2) Date: Jun. 23, 2017

(87) PCT Pub. No.: WO2016/133017
PCT Pub. Date: Aug. 25, 2016

(65) Prior Publication Data
US 2018/0327274 A1 Nov. 15, 2018

(30) Foreign Application Priority Data

Feb. 16, 2015 (JP) ................................. 2015-027867
Jan. 22, 2016 (JP) ................................. 2016-010755

(51) Int. Cl.
*C01G 19/02* (2006.01)

(52) U.S. Cl.
CPC .......... *C01G 19/02* (2013.01); *C01P 2004/03* (2013.01); *C01P 2004/51* (2013.01); *C01P 2004/61* (2013.01); *C01P 2006/11* (2013.01); *C01P 2006/12* (2013.01); *C01P 2006/80* (2013.01)

(58) Field of Classification Search
CPC .. C01G 19/02; C01P 2004/03; C01P 2004/61; C01P 2006/11; C01P 2006/12; C01P 2006/80
USPC ......................................................... 428/402
See application file for complete search history.

(56) References Cited

FOREIGN PATENT DOCUMENTS

| CN | 101665266 A | 3/2010 |
|---|---|---|
| CN | 102275981 A | 12/2011 |
| JP | 62-207717 A | 9/1987 |
| JP | 11-310415 A | 11/1999 |
| JP | 2011-026172 A | 2/2011 |
| JP | 2013-079186 A | 5/2013 |
| WO | 2015/133426 A1 | 9/2015 |

OTHER PUBLICATIONS

Ying Liang et al., "Synthesis and characterization of SnO with controlled flowerlike microstructure", Materials Letters, (Oct. 1, 2013), vol. 108, p. 235-238.*
M. Zubair Iqbal et al., "Synthesis of novel nano-flowers assembled with nano-petals array of stannous oxide", Materials Letters, May 15, 2012, vol. 75, p. 236-239.*
Bin Liu et al., "Room temperature synthesis, photoluminescence and photocatalytic properties of SnO nanosheet-based flowerlike architectures", Applied Physics A, May 2012, vol. 107, No. 2, p. 437-443.*
Hiroaki Uchiyama, "Suiyoaki prosess . . . ", Boundary, Dec. 15, 2006, vol. 22, No. 12, p. 19.*
Ying Liang et al., "Synthesis and characterization of SnO with controlled flowerlike microstructures," Materials Letters, Oct. 1, 2013, vol. 108, pp. 235-238. (cited in the ISR).
M. Zubair Iqbal et al., "Synthesis of novel nano-flowers assembled with nano-petals array of stannous oxide," Materials Letters, May 15, 2012, vol. 75, pp. 236-239. (cited in the ISR).
Bin Liu et al., "Room-temperature synthesis, photoluminescence and photocatalytic properties of SnO nanosheet-based flowerlike architectures," Applied Physics A, May 2012, vol. 107, No. 2, pp. 437-443. (cited in the ISR).
Hiroaki Uchiyama, "Suiyoeki Process ni yoru Sankasuzu Kessho no Kozo Design," Boundary, Dec. 15, 2006, vol. 22, No. 12, p. 19 and a cover page. (see attached ISR for relevance).
International Search Report dated Apr. 19, 2016, issued for PCT/JP2016/054118 and English translation thereof.
Office Action dated Jan. 29, 2018, issued for the Chinese patent application No. 201680003782.1 and the partial English translation of the search report.

* cited by examiner

Primary Examiner — Leszek B Kiliman
(74) Attorney, Agent, or Firm — Locke Lord LLP

(57) ABSTRACT

A stannous oxide powder which has a high dissolution rate into various acid solutions such as a plating solution and is particularly suitable as a Sn supply material to a plating solution, and a method for producing the stannous oxide powder are provided. The stannous oxide powder is a particle body having a plurality of plate-like protrusions protruding outward, and has an average particle size in a range of 1 μm to 15 μm.

16 Claims, 4 Drawing Sheets

STANNOUS OXIDE POWDER AND METHOD FOR PRODUCING STANNOUS OXIDE POWDER

TECHNICAL FIELD

The present invention relates to a stannous oxide powder used as a Sn raw material for soldering, plating, and the like, and a method for producing a stannous oxide powder.

Priority is claimed on Japanese Patent Application No. 2015-027867, filed on Feb. 16, 2015, and Japanese Patent Application No. 2016-010755, filed on Jan. 22, 2016, the contents of which are incorporated herein by reference.

BACKGROUND ART

Sn is widely used as a plating material for forming a coating film on the surface of a metal material. For example, as an electronic component material such as a lead frame and a connector, a plated copper material obtained by performing Sn plating or solder plating on the surface of a copper base material made of copper or a copper alloy has been widely used. The plated copper material is also used in the semiconductor device mentioned above.

In addition, a tinplate material in which a Sn coating is formed on a steel sheet has been hitherto used for various purposes.

Here, in a case of performing Sn plating, there is concern that the characteristics of a coating film may change due to precipitation of impurities in a plating solution together with Sn. Furthermore, impurities in the plating solution greatly affect the plating properties. Therefore, there is a demand for a plating solution with a reduced amount of impurities.

As a Sn supply material for supplying Sn to the plating solution mentioned above, powder of stannous oxide or the like is typically used. The stannous oxide powder is required to dissolve quickly in the plating solution and to have a reduced amount of impurities.

Here, Patent Documents 1 and 2 provide a stannous oxide powder which has a small amount of alkali and chlorine and is readily soluble in acid.

CITATION LIST

Patent Literature

[Patent Document 1] Japanese Unexamined Patent Application, First Publication No. H11-310415
[Patent Document 2] Japanese Unexamined Patent Application, First Publication No. 2013-079186

DISCLOSURE OF INVENTION

Technical Problem

However, the stannous oxide powder described in Patent Document 1 has a cubic shape, for example, as shown in FIG. 4, and thus has a relatively small specific surface area and an insufficient dissolution rate into a plating solution.

In addition, the stannous oxide powder described in Patent Document 2 also has a plate-like or spherical shape, and similarly has an insufficient dissolution rate.

The present invention has been made taking the foregoing circumstances into consideration, and an object thereof is to provide a stannous oxide powder which has a high dissolution rate into various acid solutions such as a plating solution and is particularly suitable as a Sn supply material to a plating solution, and a method for producing the stannous oxide powder.

Solution to Problem

In order to solve the problems, according to an aspect of the present invention, a stannous oxide powder is a particle body having a plurality of plate-like protrusions protruding outward, and has an average particle size in a range of 1 μm to 15 μm.

In the stannous oxide powder according to the aspect of the present invention configured as described above, since the stannous oxide powder has a plurality of plate-like protrusions protruding outward, when added to a plating solution or the like, the plating solution flows between the plate-like protrusions such that contact between the plate-like protrusions and the plating solution is promoted. In addition, since the average particle size of the stannous oxide powder is in a range of 1 μm to 15 μm, the specific surface area thereof increases, and contact with the plating solution and the like is promoted.

Therefore, the stannous oxide powder according to the aspect of the present invention significantly increases the dissolution rate into a plating solution or the like, and is thus particularly suitable as a Sn supply material to the plating solution or the like.

Here, in the stannous oxide powder according to the aspect of the present invention, it is preferable that a specific surface area of the stannous oxide powder is 1.0 $m^2/g$ or more.

In this case, since the specific surface area thereof is as relatively large as 1.0 $m^2/g$ or more, contact with the plating solution or the like is promoted, and the dissolution rate into the plating solution or the like can be reliably increased.

In the stannous oxide powder according to the aspect of the present invention, it is preferable that a bulk density of the stannous oxide powder is in a range of 1.5 $g/cm^3$ or more and less than 2.0 $g/cm^3$.

In this case, since the bulk density of the stannous oxide powder is in the above-mentioned range, easy handling is achieved.

Furthermore, in the stannous oxide powder according to the aspect of the present invention, it is preferable that the amount of alkali is 10 ppm by mass or less, and the amount of acid (excluding carbonic acid) is 50 ppm by mass or less.

In this case, since the amount of alkali and the amount of acid are defined as described above, even when the stannous oxide powder is added to the plating solution or the like as a Sn supply material, a change in the composition of the plating solution can be suppressed. In addition, carbonic acid forms bubbles and escapes, the carbonic acid is not evaluated to obtain the amount of acid.

In addition, it is preferable that the stannous oxide powder according to the aspect of the present invention further includes 0.2 mass % or more of carbonic acid.

In this case, the stannous oxide powder can be dissolved together with the formation of bubbles of carbonic acid, and dissolution into the plating solution or the like can be further promoted. In addition, oxidation of the stannous oxide powder can be suppressed.

According to another aspect of the present invention, a method for producing a stannous oxide powder for producing the stannous oxide powder described above includes: an Sn ion-containing acid solution forming step of causing Sn ions to be contained in an acid solution, thereby obtaining an Sn ion-containing acid solution; a first neutralization step of adding an alkaline solution of any one or more selected from ammonium carbonate, ammonium bicarbonate, and ammonia water to the Sn ion-containing acid solution to maintain a pH of 3 to 6, thereby obtaining a Sn precipitate; a Sn precipitate separation step of separating the Sn precipitate from the Sn ion-containing acid solution; a Sn precipitate dispersion step of dispersing the separated Sn precipitate in a solvent; and a second neutralization step of maintaining the dispersion liquid of the Sn precipitate at 50° C. or lower, and adding an alkaline solution thereto for 1 hour or longer to achieve a pH of 6 to 12, thereby obtaining SnO from the Sn precipitate.

According to the method for producing a stannous oxide powder in this configuration, a stannous oxide powder which is a particle body having a plurality of plate-like protrusions protruding outward, has an average particle size in a range of 1 μm to 15 μm, has a high dissolution rate into various acid solutions such as a plating solution, and is particularly suitable as a Sn supply material to the plating solution can be produced.

Advantageous Effects of Invention

As described above, according to the present invention, a stannous oxide powder which has a high dissolution rate into various acid solutions such as a plating solution and is particularly suitable as a Sn supply material to a plating solution, and a method for producing the stannous oxide powder can be provided.

BEST MODE FOR CARRYING OUT THE INVENTION

Hereinafter, a stannous oxide powder 10 according to an embodiment of the present invention and a method for producing the stannous oxide powder 10 will be described.

The stannous oxide powder 10 according to this embodiment is used as a Sn supply material to a plating solution used for Sn plating, for example.

Figure 1:
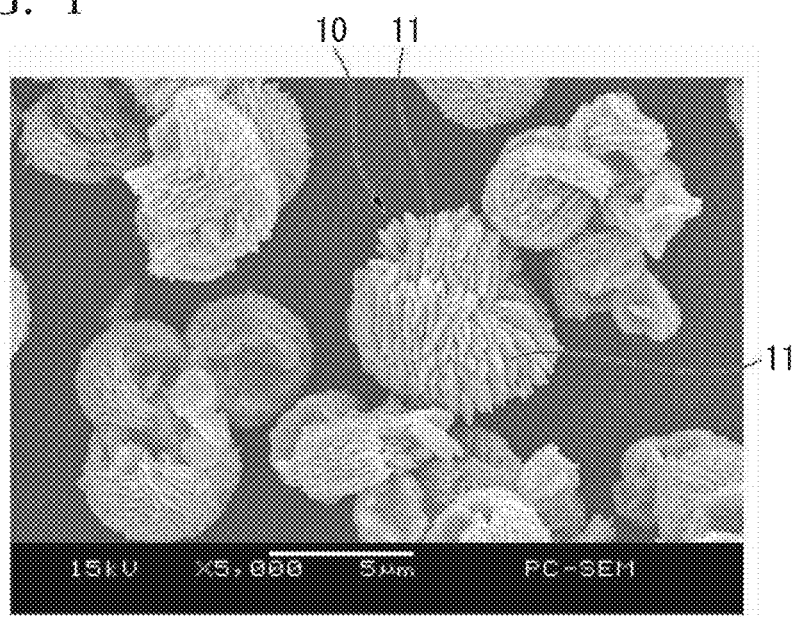
FIG. 1 is a SEM observation photograph of a stannous oxide powder (Example 1 of the present invention in examples) according to an embodiment of the present invention.

As shown in FIG. 1, the stannous oxide powder 10 according to this embodiment is a particle body having a plurality of plate-like protrusions 11 protruding outward, in which the plurality of plate-like protrusions 11 are arranged in layers with intervals therebetween on the outer surface thereof. That is, the stannous oxide powder 10 according to this embodiment is a particle body having a substantially spherical shape as a whole, in which the plurality of plate-like protrusions 11 protruding outward are arranged. It is preferable that 100 or more plate-like protrusions 11 are arranged in a single particle of the stannous oxide powder 10. 500 or less plate-like protrusions 11 may be present in a single particle of the stannous oxide powder 10, but the number thereof is not limited thereto.

In addition, the stannous oxide powder 10 according to this embodiment has an average particle size in a range of 1 μm to 15 μm. The average particle size (D50) in this embodiment was defined by the volume cumulative median diameter measured using a particle size distribution measurement apparatus (model name: MICROTRAC MT3000 particle size analyzer manufactured by Microtrac, Inc).

Here, in a case where the average particle size of the stannous oxide powder 10 is less than 1 μm, the stannous oxide powder 10 agglomerates together, and there is concern that contact with the plating solution may be impeded and dissolution may not be promoted. On the other hand, in a case where the average particle size of the stannous oxide powder 10 exceeds 15 μm, there is concern that the specific surface area thereof may not be sufficiently large, dissolution may not be accelerated, and the dissolution rate may be insufficient.

Therefore, in this embodiment, the particle size of the stannous oxide powder 10 is set to be in a range of 1 μM to 15 μm. In order to suppress the agglomeration of the stannous oxide powder 10 and improve the dissolution rate into the plating solution, it is preferable that the lower limit of the average particle size of the stannous oxide powder 10 is 2 μm or more. In order to increase the specific surface area and improve the dissolution rate into the plating solution, the upper limit of the average particle size of the stannous oxide powder 10 is preferably 10 μm or less, and more preferably 7 μm or less.

In addition, the stannous oxide powder 10 according to this embodiment has a specific surface area of 1.0 $m^2/g$ or more. The specific surface area of the stannous oxide powder 10 is measured using a BET flow method. By causing the specific surface area of the stannous oxide powder 10 to be 1.0 $m^2/g$ or more, the dissolution rate into the plating solution can be reliably improved.

In order to more reliably improve the dissolution rate into the plating solution, the specific surface area of the stannous oxide powder 10 is preferably 1.5 $m^2/g$ or more, and more preferably 2.0 $m^2/g$ or more. The upper limit of the specific surface area of the stannous oxide powder 10 is not particularly limited, and is preferably 10.0 $m^2/g$ or less.

Furthermore, the bulk density thereof decreases due to the shape effect, and may be less than 2.0 $g/cm^3$. However, a bulk density of less than 1.5 $g/cm^3$ results in poor handling.

Here, in a case where the thickness of the plate-like protrusion 11 is less than 10 nm, or in a case where the thickness of the plate-like protrusion 11 exceeds 500 nm, contact with the plating solution or the like becomes insufficient, and there is concern that dissolution may not be promoted.

Therefore, in order to sufficiently bring the plate-like protrusions 11 into contact with the plating solution or the like to reliably promote dissolution into the plating solution or the like, it is preferable that the thickness of the plate-like protrusion 11 is 10 nm or more and 500 nm or less. In addition, it is more preferable that the upper limit of the thickness of the plate-like protrusion 11 is 100 nm or less.

Here, in this embodiment, the thickness of the plate-like protrusion 11 was visually measured with reference to a scale bar using an image obtained by SEM observation at a magnification of 20,000 times and was obtained by calculation. Specifically, the thickness of the plate-like protrusion 11 in the SEM image is measured, and the thickness of an actual plate-like protrusion 11 is calculated from the ratio to the length of the scale bar.

In the stannous oxide powder 10 according to this embodiment, the amount of alkali is 10 ppm by mass or less, and the amount of acid (excluding carbonic acid) is 50 ppm by mass or less.

In this embodiment, the amount of acid is defined by the acid used in producing the stannous oxide powder 10, and in a case where hydrochloric acid is used, the amount of chlorine is obtained. In a case where sulfuric acid is used, the amount of sulfate ions is obtained. In a case of using the two, the total value thereof is obtained. The amount of acid in a case where nitric acid is used is the amount of nitrate ions. In addition, since carbonic acid forms bubbles and escapes, the carbonic acid is not evaluated to obtain the amount of acid.

Furthermore, the amount of alkali is obtained mainly by the amount of residual ammonia component, and since Na and K are present in trace amounts, Na and K were evaluated as impurities.

Here, the amount of alkali is preferably 10 ppm by mass or less, and more preferably 5 ppm by mass or less. The amount of acid (excluding carbonic acid) is preferably 50 ppm by mass or less, and more preferably 10 ppm by mass or less.

Furthermore, in the stannous oxide powder 10 according to this embodiment, the amounts of other impurities are also reduced. For example, the contents of Na, K, Pb, Fe, Ni, Cu, Zn, Al, Mg, Ca, Cr, Mn, Co, In, and Cd are each 1 ppm by mass or less.

The total amount of Na, K, Pb, Fe, Ni, Cu, Zn, Al, Mg, Ca, Cr, Mn, Co, In, and Cd is less than 15 ppm by mass, and preferably 7.5 less than ppm by mass.

Here, Pb has similar properties to Sn, and is an element which is less likely to be separated from Sn. In addition, Na and K are elements which may be incorporated during purification of the Sn raw material. Fe, Ni, Cu and Zn are elements which are easily incorporated into the plating solution from a material to be plated or undercoat. Al, Mg, Ca, Cr, Mn, Co, In and Cd are elements which may be incorporated into the Sn raw material.

Therefore, in the stannous oxide powder 10 used as the Sn supply material of the plating solution, it is possible to suppress the accumulation of impurities in the plating solution by reducing the amounts of these impurity elements.

Furthermore, the stannous oxide powder 10 according to this embodiment preferably contains 0.2 mass % or more of carbonic acid. By causing 0.2 mass % or more of carbonic acid to be contained, the stannous oxide powder 10 is dissolved as the carbonic acid forms bubbles, resulting a further improvement in solubility. Furthermore, it also becomes possible to suppress oxidation of the stannous oxide powder 10 by the carbonic acid.

Here, in order to further improve solubility and suppress oxidation, the carbonic acid is contained preferably in an amount of 0.3 mass % or more, and more preferably in an amount of 0.5 mass % or more. The upper limit of the amount of the carbonic acid in the stannous oxide powder 10 is not particularly limited. However, since it is difficult to cause carbonic acid to be contained in an amount of more than 1.0 mass %, the upper limit thereof is preferably 1.0 mass % or less.

Figure 2:
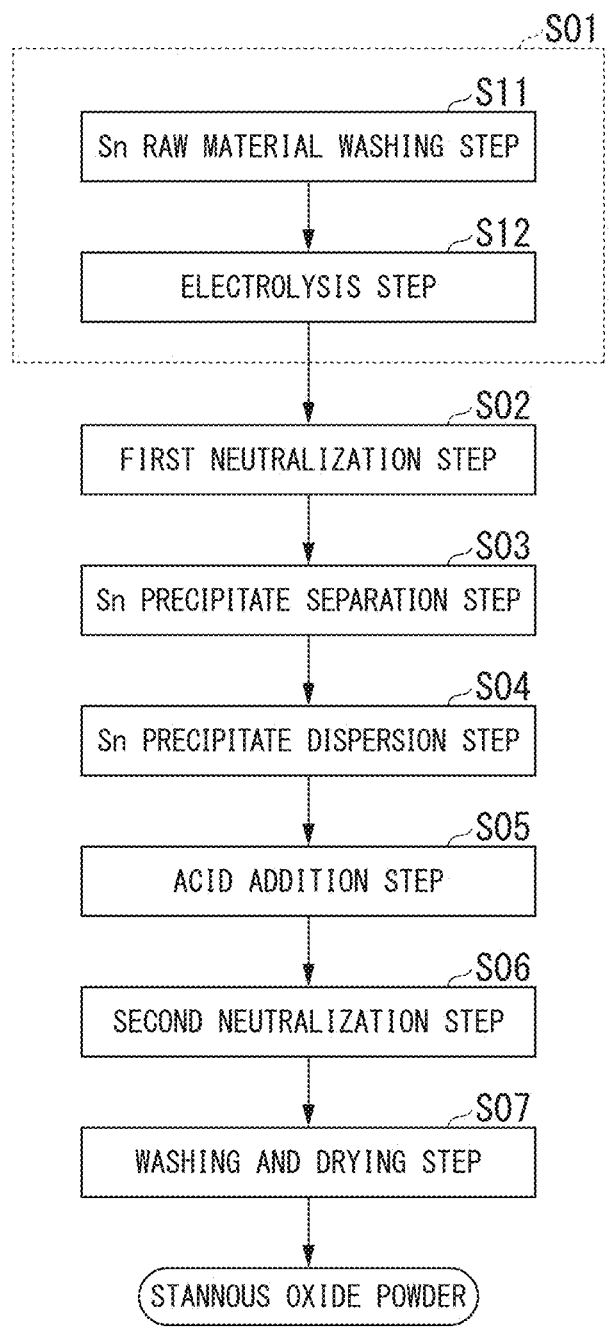
FIG. 2 is a flowchart showing a method for producing the stannous oxide powder shown in FIG. 1.
Figure 3:
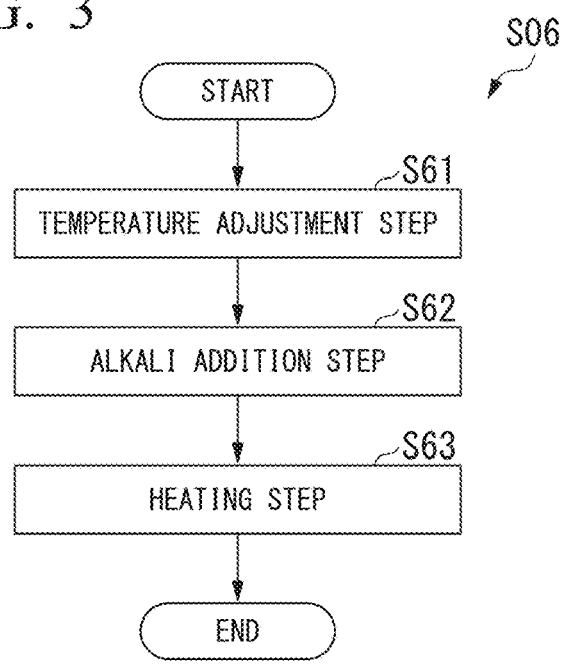
FIG. 3 is a flowchart of a second neutralization step in FIG. 2.

Next, a method for producing the stannous oxide powder 10 according to this embodiment will be described with reference to the flowcharts of FIGS. 2 and 3.

(Sn Ion-Containing Acid Solution Forming Step S01)

First, Sn ions are added to an acid solution, thereby forming a Sn ion-containing acid solution. In this embodiment, high-purity metal Sn (a purity of 99.99 mass % or higher) is prepared, and the surface of the metal Sn is washed with an acidic detergent (Sn raw material washing step S11). At this time, the oil content and oxides on the surface of the metal Sn are removed, and washing is performed until the surface of the metal Sn shows metallic luster.

Next, the washed metal Sn is subjected to electrolysis to be dissolved in an acid solution, thereby forming a Sn ion-containing acid solution (electrolysis step S12). At this time, the acid solution is not particularly limited, and methanesulfonic acid, hydrochloric acid, nitric acid, sulfuric acid, fluoroboric acid, phenolsulfonic acid, alkanol sulfonic acid, alkyl sulfonic acid and the like, or a mixture thereof may be used. For example, the concentration of Sn is preferably in a range of 50 g/L to 150 g/L, and is 100 to 110 g/L in this embodiment. In addition, as the Sn ion-containing acid solution, a Sn plating solution having the above-described acid solution may also be used.

(First Neutralization Step S02)

Next, an alkaline solution of any one or more selected from ammonium carbonate, ammonium bicarbonate, and ammonia water is added to the Sn ion-containing acid solution to maintain a pH of 3 to 6, thereby obtaining a Sn precipitate (tin hydroxide or the like). At this time, Sn is recovered as the Sn precipitate (tin hydroxide or the like), and elements such as Na, K, Fe, Ni, Cu, Zn, Al, Mg, Ca, Cr, Mn, Co, In and Cd remains in the Sn ion-containing acid solution.

In this embodiment, an aqueous solution of ammonium bicarbonate is added until the pH is in a range of 3.5 to 4.

(Sn Precipitate Separation Step S03)

Next, the Sn precipitate (tin hydroxide or the like) is separated from the Sn ion-containing acid solution.

(Sn Precipitate Dispersion Step S04)

Next, dispersion and filtration are repeatedly performed on the separated Sn precipitate (tin hydroxide or the like) by pure water 2 to 3 times to wash the Sn precipitate (tin hydroxide or the like). Accordingly, impurities attached to the surface of the Sn precipitate (tin hydroxide or the like) are removed. The Sn precipitate (tin hydroxide or the like) after being washed is then dispersed in pure water.

(Acid Addition Step S05)

If necessary, hydrochloric acid or citric acid is added to the dispersion liquid in which the Sn precipitate (tin hydroxide or the like) is dispersed. By the acid addition step S05, the acid component in the Sn precipitate (tin hydroxide or the like) before the first neutralization step S02 is separated.

(Second Neutralization Step S06)

Next, an alkaline solution is added to the dispersion liquid in which the Sn precipitate (tin hydroxide or the like) is dispersed and the resultant is heated, thereby obtaining SnO (stannous oxide) from the Sn precipitate (tin hydroxide or the like). In the second neutralization step S06, SnO (stannous oxide) is formed by dehydrating the Sn precipitate (tin hydroxide or the like). Here, in a case where one containing carbonic acid such as ammonium carbonate or ammonium bicarbonate is added as the alkaline solution, carbonic acid is contained in the stannous oxide powder 10.

In this embodiment, an aqueous solution of ammonium bicarbonate is added as the alkaline solution until the pH reaches 6 or higher.

The second neutralization step S06 will be described in detail. First, the temperature of the dispersion liquid in which the Sn precipitate (tin hydroxide or the like) is dispersed is caused to be 50° C. or lower (temperature adjustment step S61).

An alkaline solution is added to the dispersion liquid having a temperature of 50° C. or lower for 1 hour or longer until the pH falls within a range of 6 to 12 (alkali addition step S62). Although there is no problem even when the pH is high, in consideration of the amount of a neutralizing agent to be used, it is preferable that the pH is about 6 to 8. If the pH is too high, stannous oxide dissolves. Therefore, the pH may be 12 or less.

Accordingly, stannous oxide (SnO) is obtained.

Here, in a case where the temperature of the dispersion liquid at the time of adding the alkaline solution exceeds 50° C., there is concern that the particle body having the plurality of plate-like protrusions 11 protruding outward may not be obtained. Therefore, in this embodiment, the temperature of the dispersion liquid at the time of adding the alkaline solution is set to 10° C. or higher and 50° C. or lower. In order to reliably obtain the particle body having the plurality of plate-like protrusions 11 protruding outward, it is preferable that the temperature of the dispersion liquid at the time of adding the alkaline solution is 30° C. or less. In addition, in a method in the related art, heating is performed to cause the dehydration reaction to proceed. However, in the present invention, since the influence of the residual acid component is small due to the neutralization performed in two steps, the dehydration reaction quickly proceeds and heating is not required.

In addition, in a case where the addition time of the alkaline solution is shorter than 1 hour, there is concern that the particle body having the plurality of plate-like protrusions 11 protruding outward may not be obtained. Therefore, in this embodiment, the addition time of the alkaline solution is limited to 1 hour or longer. In order to reliably obtain the particle body having the plurality of plate-like protrusions 11 protruding outward, it is preferable that the addition time of the alkaline solution is 1 hour and 20 minutes or longer. The upper limit of the addition time of the alkaline solution is not particularly limited, but is preferably 2 hours or shorter from the viewpoint of working efficiency.

(Washing and Drying Step S07)

Next, dispersion and filtration are repeatedly performed on the obtained SnO (stannous oxide) by pure water 2 to 3 times to wash the SnO (stannous oxide). Accordingly, ammonium salts and the like attached to the surface of the SnO (stannous oxide) are removed. Then, the SnO (stannous oxide) after being washed is filtered and dried.

Through the above steps, the stannous oxide powder 10 according to this embodiment is produced.

According to the stannous oxide powder 10 according to this embodiment configured as described above, as shown in FIG. 1, since the stannous oxide powder is the particle body having the plurality of plate-like protrusions 11 protruding outwards, in a case being added to the plating solution, the plating solution flows between the plate-like protrusions 11 such that contact between the plate-like protrusions 11 and the plating solution is promoted. In addition, since the average particle size of the stannous oxide powder 10 is in a range of 1 μm to 15 μm, the specific surface area thereof increases. Specifically, it is possible for the specific surface area of the stannous oxide powder 10 to be 1.0 m²/g or more.

As described above, in the stannous oxide powder 10 according to this embodiment, the dissolution rate thereof into a plating solution or the like can be significantly improved.

Furthermore, in this embodiment, since the thickness of the plate-like protrusion 11 is in a range of 10 nm to 500 nm, contact between the plate-like protrusions 11 and the plating solution can be reliably promoted, and the solubility to the plating solution can be reliably improved.

Furthermore, in the stannous oxide powder 10 of this embodiment, since the bulk density thereof is in a range of 1.5 g/cm³ or more and less than 2.0 g/cm³, easy handling is achieved.

Furthermore, in the stannous oxide powder 10 of this embodiment, since the amount of alkali is 10 ppm by mass or less and the amount of acid (excluding carbonic acid) is 50 ppm by mass or less, even when the stannous oxide powder 10 is added to the plating solution as a Sn supply material, a change in the composition of the plating solution can be suppressed.

In the stannous oxide powder 10 of this embodiment, the contents of Na, K, Pb, Fe, Ni, Cu, Zn, Al, Mg, Ca, Cr, Mn, Co, In, and Cd are each 1 ppm by mass or less, accumulation of these impurity elements in the plating solution can be suppressed, and thus deterioration of the plating solution can be suppressed.

In the stannous oxide powder 10 of this embodiment, since 0.2 mass % or more of carbonic acid is contained, the stannous oxide powder 10 can be dissolved together with the formation of bubbles of carbonic acid, and dissolution into the plating solution or the like can be further promoted. Moreover, since carbonic acid is present, the surrounding oxygen is removed and a carbonic acid atmosphere is achieved, thereby suppressing oxidation of the stannous oxide powder 10.

Furthermore, in this embodiment, in the second neutralization step S06 of adding the alkaline solution to the dispersion liquid in which the Sn precipitate (tin hydroxide or the like) is dispersed and heating the resultant, since the temperature of the dispersion liquid is 50° C. or lower at the time of adding the alkaline solution and the addition time of the alkaline solution is 1 hour or longer, coarsening of particles of the stannous oxide produced in the second neutralization step S06 can be suppressed, and it becomes possible to form the particle body having the plurality of plate-like protrusions 11 protruding outward.

In addition, in this embodiment, since the first neutralization step S02 of adding the alkaline solution (in this embodiment, ammonium bicarbonate) to the Sn ion-containing acid solution to maintain a pH of 3 to 6 thereby obtaining the Sn precipitate (tin hydroxide or the like) is provided, it becomes possible to reduce the contents of Na, K, Pb, Fe, Ni, Cu, Zn, Al, Mg, Ca, Cr, Mn, Co, In, and Cd in the Sn precipitate (tin hydroxide or the like).

In addition, since the Sn precipitate separation step S03 of separating the Sn precipitate (tin hydroxide or the like) from the Sn ion-containing acid solution, the precipitate dispersion step S04 of dispersing the separated Sn precipitate (tin hydroxide or the like) in a solvent such as pure water, and the second neutralization step S06 of adding the alkaline solution to the dispersion liquid of the Sn precipitate (tin hydroxide or the like) and heating the resultant thereby obtaining SnO (stannous oxide) from the Sn precipitate (tin hydroxide or the like) are provided, it becomes possible to efficiently obtain the stannous oxide powder 10 having reduced contents of Na, K, Pb, Fe, Ni, Cu, Zn, Al, Mg, Ca, Cr, Mn, Co, In, and Cd.

In this embodiment, since the acid addition step S05 of adding hydrochloric acid or citric acid to the dispersion liquid of the Sn precipitate (tin hydroxide or the like) is provided between the Sn precipitate dispersion step S04 and the second neutralization step S06, even when an acid component is contained in the Sn precipitate (tin hydroxide or the like) before the first neutralization step S02, the acid component can be removed, and it becomes possible to efficiently form the SnO (stannous oxide) in the subsequent second neutralization step S06.

While the embodiment of the present invention has been described above, the present invention is not limited thereto, and can be appropriately changed without departing from the technical spirit of the invention.

For example, in this embodiment, although it has been described that the metal Sn is subjected to electrolysis to be dissolved in the Sn ion-containing acid solution forming step S01, the present invention is not limited thereto, and a Sn ion-containing acid solution obtained by another method may also be used. Therefore, it is also possible to recycle the acid-based tin plating solution.

Although it has been described that the acid addition step S05 of adding hydrochloric acid or citric acid is provided between the Sn precipitate dispersion step S04 and the second neutralization step S06, the acid addition step S05 may also be omitted.

EXAMPLES

Hereinafter, the results of confirmatory experiments conducted to confirm the effectiveness of the present invention will be described.

In Examples 1 to 4 and Comparative Examples 1 and 2, as a first neutralization step, ammonium bicarbonate was added to an aqueous solution of tin hydrochloride to neutralize the solution to a pH of 4. In the first neutralization step, the temperature of the aqueous solution of tin hydrochloride at the time of adding ammonium bicarbonate and the addition time of ammonium bicarbonate were set to the conditions shown in Table 1. The obtained cake was washed to obtain a Sn precipitate, and the Sn precipitate was re-dispersed in pure water. Next, as a second neutralization step, ammonium bicarbonate was added to the dispersion liquid of the Sn precipitate to neutralize the dispersion liquid to a pH of 7, and the obtained cake was then washed and dried, thereby obtaining a stannous oxide powder. In addition, in the second neutralization step, the temperature of the dispersion liquid at the time of adding ammonium bicarbonate and the addition time of ammonium bicarbonate were set to the conditions shown in Table 1.

In Example 5, as a first neutralization step, ammonium bicarbonate was added to an aqueous solution of tin sulfate to neutralize the solution to a pH of 4. In the first neutralization step, the temperature of the aqueous solution of tin sulfate at the time of adding ammonium bicarbonate and the addition time of ammonium bicarbonate were set to the conditions shown in Table 1. The obtained cake was washed to obtain a Sn precipitate, and the Sn precipitate was re-dispersed in pure water. Next, hydrochloric acid was added to dissolve the Sn precipitate. Thereafter, as a second neutralization step, ammonium bicarbonate was added to neutralize the dispersion liquid to a pH 7, and the obtained cake was then washed and dried, thereby obtaining a stannous oxide powder. In addition, in the second neutralization step, the temperature of the dispersion liquid at the time of adding ammonium bicarbonate and the addition time of ammonium bicarbonate were set to the conditions shown in Table 1.

In Example 6, as a first neutralization step, ammonium carbonate was added to an aqueous solution of tin nitrate to neutralize the solution to a pH of 4. In the first neutralization step, the temperature of the aqueous solution of tin nitrate at the time of adding ammonium carbonate and the addition time of ammonium carbonate were set to the conditions shown in Table 1. The obtained cake was washed to obtain a Sn precipitate, and the Sn precipitate was re-dispersed in pure water. Next, hydrochloric acid was added to dissolve the Sn precipitate. Thereafter, as a second neutralization step, ammonium carbonate was added to neutralize the dispersion liquid to a pH of 7, and the obtained cake was washed and dried, thereby obtaining a stannous oxide powder. In addition, in the second neutralization step, the temperature of the dispersion liquid at the time of adding ammonium carbonate and the addition time of ammonium carbonate were set to the conditions shown in Table 1.

In Example 7, as a first neutralization step, ammonium bicarbonate was added to an aqueous solution of tin hydrochloride to neutralize the solution to a pH of 4. In the first neutralization step, the temperature of the aqueous solution of tin hydrochloride at the time of adding ammonium bicarbonate and the addition time of ammonium bicarbonate were set to the conditions shown in Table 1. The obtained cake was washed to obtain a Sn precipitate, and the Sn precipitate was re-dispersed in pure water. Next, as a second neutralization step, ammonia water was added to the dispersion liquid of the Sn precipitate to neutralize the dispersion liquid to a pH of 7, the obtained cake was washed and dried, thereby obtaining a stannous oxide powder. In addition, in the second neutralization step, the temperature of the dispersion liquid at the time of adding ammonia water and the addition time of ammonia water were set to the conditions shown in Table 1.

In Example 8, as a first neutralization step, ammonium bicarbonate was added to an aqueous solution of tin sulfate to neutralize the solution to a pH of 4. In the first neutralization step, the temperature of the aqueous solution of tin sulfate at the time of adding ammonium bicarbonate and the addition time of ammonium bicarbonate were set to the conditions shown in Table 1. The obtained cake was washed to obtain a Sn precipitate, and the Sn precipitate was re-dispersed in pure water. Next, as a second neutralization step, ammonium bicarbonate was added to the dispersion liquid of the Sn precipitate to neutralize the dispersion liquid to a pH of 7, and the obtained cake was washed and dried, thereby obtaining a stannous oxide powder. In addition, in the second neutralization step, the temperature of the dispersion liquid at the time of adding ammonium bicarbonate and the addition time of ammonium bicarbonate were set to the conditions shown in Table 1.

In Example 9, as a first neutralization step, ammonium carbonate was added to an aqueous solution of tin nitrate to neutralize the solution to a pH of 4. In the first neutralization step, the temperature of the aqueous solution of tin nitrate at the time of adding ammonium carbonate and the addition time of ammonium carbonate were set to the conditions shown in Table 1. The obtained cake was washed to obtain a Sn precipitate, and the Sn precipitate was re-dispersed in pure water. Next, as a second neutralization step, ammonium carbonate was added to the dispersion liquid of the Sn precipitate to neutralize the dispersion liquid to a pH of 7, and the obtained cake was washed and dried, thereby obtaining a stannous oxide powder. In the second neutralization step, the temperature of the dispersion liquid at the time of adding ammonium carbonate and the addition time of ammonium carbonate were set to the conditions shown in Table 1.

In Comparative Examples 3 and 4, as a neutralization step, ammonium bicarbonate was added to an aqueous solution of tin sulfate to neutralize the solution to a pH of 7 while being heated, and the obtained cake was washed and dried, thereby obtaining a stannous oxide powder.

In Comparative Example 5, as a neutralization step, ammonium bicarbonate was added to an aqueous solution of tin hydrochloride to neutralize the solution to a pH of 9 while being heated, the suspension was heated at 100° C. and held for 1 hour after the completion of the neutralization, and the obtained cake was washed and dried, thereby obtaining a stannous oxide powder.

In addition, in the neutralization step, the temperature of the dispersion liquid at the time of adding ammonium bicarbonate and the addition time of ammonium bicarbonate were set to the conditions shown in Table 1. That is, in Comparative Examples 3, 4 and 5, the stannous oxide powder was obtained by one neutralization step.

The stannous oxide powder obtained as described above was evaluated as follows.

<Particle Shape>

The obtained stannous oxide powder was observed by SEM at a magnification of 5000 times, and the particle shape was checked. A case where all the particles of the powder were "particle bodies having a plurality of plate-like protrusions protruding outward" was evaluated as "A", and a case where plate-like particles were partly present was evaluated as "B". The evaluation results are shown in Table 1.

<Average Particle Size of Stannous Oxide Powder>

The average particle size (D50) of the obtained stannous oxide powder was evaluated as the volume cumulative median diameter measured using a particle size distribution measurement apparatus (model name: Microtrac MT3000 particle size analyzer manufactured by Microtrac, Inc). The evaluation results are shown in Table 1.

<Specific Surface Area of Stannous Oxide Powder>

The specific surface area of the obtained stannous oxide powder was measured by the BET flow method (Macsorb HM model-1201). The measurement results are shown in Table 1.

<Bulk Density of Stannous Oxide Powder>

The bulk density of the obtained stannous oxide powder was obtained by a constant volume measurement method using a JIS bulk specific gravity measurement instrument (manufactured by Tsutsui Scientific Instruments Co., Ltd.). For details of the measurement method, first, the mass of a measurement container (made of stainless steel, volume 25 mL) was measured by a scale. Next, a sample was poured into the measurement container through a sieve (made of stainless steel, diameter 2.5 mm) until the measurement container overflowed with the sample. At this time, vibration was not added to the measurement container, and the sample was not compressed. Thereafter, the powder raised from the upper end surface of the measurement container was levelled off with a levelling plate. At this time, the levelling plate was used by being inclined rearward in the levelling direction so as not to cause the powder to be compressed by the levelling plate. Last, the mass of each measurement container was measured by the scale, the mass of the sample was calculated by subtracting the mass of the measurement container and the bulk density was calculated from the volume of the measurement container. The measurement results are shown in Table 1.

<Amount of Carbonic Acid of Stannous Oxide Powder>

The amount of carbonic acid in the obtained stannous oxide powder was measured by ion chromatogram. The measurement results are shown in Table 1.

<Evaluation of Solubility>

100 ml of 100 g/L alkyl sulfonic acid was put into a 200 ml beaker (manufactured by Hario Co., Ltd.), and was held at 25° C. In this state, 1 g of the above-described stannous oxide powder was added and stirred. For stirring, a rod-shaped rotor (manufactured by AS ONE Corporation) having a length of 30 mm was used and the stirring speed was 500 rpm.

After the added stannous oxide powder was dispersed and suspended, the time taken until the stannous oxide powder was completely dissolved and the solution became transparent was evaluated. The evaluation results are shown in Table 2.

<Measurement of Alkaline Amount and Amount of Acid>

The ammonia component in the obtained stannous oxide powder was measured by an ion chromatogram and defined as the amount of alkali.

The amount of acid in the stannous oxide powder produced using the aqueous solution of tin hydrochloride was evaluated as the amount of chlorine. The amount of chlorine in the stannous oxide powder was measured by acid dissolution turbidimetry. In acid dissolution turbidimetry, the amount of chlorine in the stannous oxide powder was obtained by dissolving the stannous oxide powder in an aqueous solution of nitric acid, adding an aqueous solution of silver nitrate, and measuring the amount of silver chloride generated by the addition with a spectrophotometer (U-2910, manufactured by Hitachi, Ltd.).

The amount of acid in the stannous oxide powder produced using the aqueous solution of tin sulfate was evaluated as the amount of sulfate ions. The amount of acid in the stannous oxide powder produced using the aqueous solution of tin nitrate was evaluated as the amount of nitrate ions. The amount of sulfate ions and the amount of nitrate ions in the stannous oxide powder were measured by ion chromatograms.

The measurement results are shown in Table 2.

TABLE 1

| | | First neutralization step | | Second neutralization step | | | Stannous oxide powder | | | |
|---|---|---|---|---|---|---|---|---|---|---|
| | | Temperature (° C.) | Time (h) | Temperature (° C.) | Time (h) | Shape | Average particle size (μm) | Specific surface area (m²/g) | Bulk density (g/cm³) | Amount of carbonic acid (mass %) |
| Examples | 1 | 23 | 0.5 | 35 | 1 | A | 15 | 1.23 | 1.74 | 0.35 |
| | 2 | 22 | 0.5 | 26 | 1.3 | A | 7 | 1.87 | 1.72 | 0.37 |
| | 3 | 24 | 0.5 | 40 | 1.5 | A | 10 | 1.45 | 1.77 | 0.36 |
| | 4 | 22 | 0.5 | 21 | 2 | A | 5 | 2.38 | 1.63 | 0.35 |
| | 5 | 23 | 0.5 | 26 | 1.3 | A | 9 | 1.47 | 1.59 | 0.32 |
| | 6 | 22 | 0.5 | 28 | 1.3 | A | 10 | 1.53 | 1.72 | 0.34 |
| | 7 | 21 | 0.5 | 40 | 1.3 | A | 8 | 1.53 | 1.84 | <0.05 |
| | 8 | 24 | 0.5 | 25 | 1.3 | A | 10 | 1.38 | 1.75 | 0.32 |
| | 9 | 22 | 0.5 | 23 | 1.3 | A | 11 | 1.67 | 1.68 | 0.32 |

TABLE 1-continued

| | | First neutralization step | | Second neutralization step | | | Stannous oxide powder | | | |
|---|---|---|---|---|---|---|---|---|---|---|
| | | Temperature (° C.) | Time (h) | Temperature (° C.) | Time (h) | Shape | Average particle size (μm) | Specific surface area (m²/g) | Bulk density (g/cm³) | Amount of carbonic acid (mass %) |
| Comparative Examples | 1 | 23 | 0.5 | 60 | 1.3 | B (partly plate shape) | 7 | 0.54 | 2.19 | 0.21 |
| | 2 | 24 | 0.5 | 25 | 0.5 | B (partly plate shape) | 18 | 0.43 | 2.24 | 0.34 |
| | 3 | >100 | 0.5 | — | — | B (entirely plate shape) | 21 | 0.23 | 2.42 | <0.05 |
| | 4 | >100 | 2 | — | — | B (entirely plate shape) | 9 | 0.48 | 2.34 | <0.05 |
| | 5 | 25 | 2 | — | — | B (entirely plate shape) | 20 | 0.25 | 2.48 | <0.05 |

TABLE 2

| | | Solubility Dissolution time (sec) | Impurities (mass ratio) | | | |
|---|---|---|---|---|---|---|
| | | | Amount of alkali (ppm) | Amount of chlorine (ppm) | Amount of SO₄²⁻ (ppm) | Amount of NO₃⁻ (ppm) |
| Examples | 1 | 2 | <10 | 40 | — | — |
| | 2 | 2 | <10 | 20 | — | — |
| | 3 | 2 | <10 | 30 | — | — |
| | 4 | 2 | <10 | 10 | — | — |
| | 5 | 2 | <10 | 30 | <10 | — |
| | 6 | 2 | <10 | 20 | — | <10 |
| | 7 | 3 | <10 | 20 | — | — |
| | 8 | 2 | <10 | <10 | 20 | — |
| | 9 | 2 | <10 | <10 | — | 30 |
| Comparative Examples | 1 | 5 | 170 | 150 | — | — |
| | 2 | 8 | 210 | 280 | — | — |
| | 3 | 21 | 270 | — | 350 | — |
| | 4 | 10 | 250 | — | 220 | — |
| | 5 | 15 | 120 | 10 | — | — |

In Comparative Example 1, the temperature of the dispersion liquid at the time of adding alkali (ammonium bicarbonate) in the second neutralization step exceeded 50° C., and a part of the obtained stannous oxide powder was not the particle body having a plurality of plate-like protrusions protruding outwards. Therefore, the dissolution time became longer, and the amount of alkali and chlorine increased.

In Comparative Example 2, the addition time of the alkali (ammonium bicarbonate) in the second neutralization step was as short as 0.5 hours, and a part of the obtained stannous oxide powder was not the particle body having a plurality of plate-like protrusions protruding outwards. Therefore, the dissolution time became longer, and the amount of alkali and chlorine increased.

Figure 4:
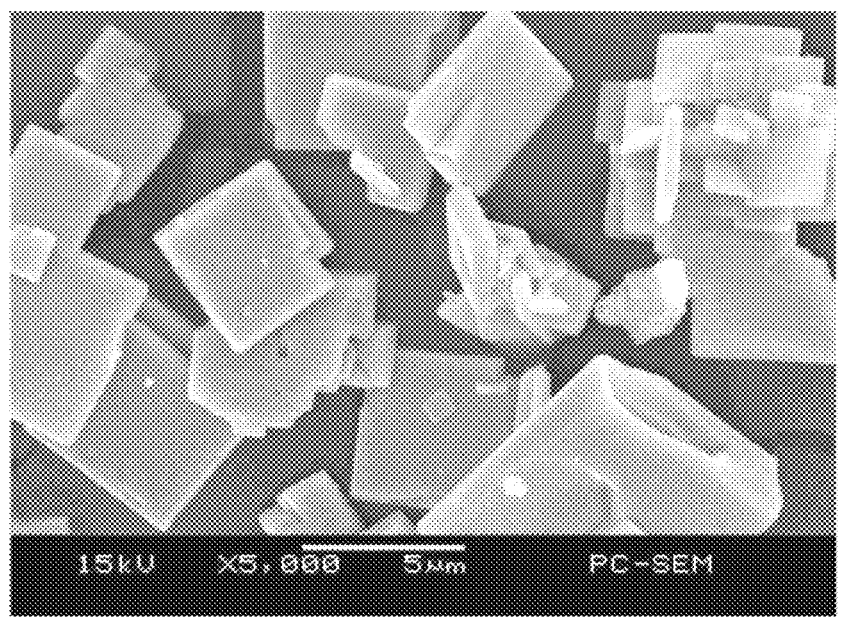
FIG. 4 is a SEM observation photograph of a stannous oxide powder in the related art.

In Comparative Examples 3 and 4, the stannous oxide powder was obtained by one neutralization step, and the stannous oxide powder was not the particle body having a plurality of plate-like protrusions protruding outwards, and for example, had a plate shape as shown in FIG. 4. Therefore, the dissolution time became longer, and the amount of alkali and sulfate ions increased.

In Comparative Example 5, the stannous oxide powder was obtained by one neutralization step, and the stannous oxide powder was not the particle body having a plurality of plate-like protrusions protruding outwards, and for example, had a plate shape as shown in FIG. 4. Therefore, the dissolution time became longer, and the amount of alkali increased although the amount of chlorine was small.

Figure 5:
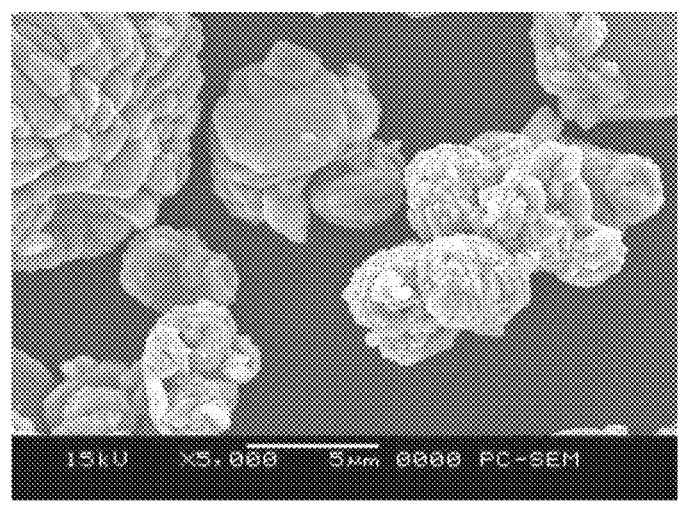
FIG. 5 is a SEM observation photograph of a stannous oxide powder of Example 7 in examples.

Contrary to this, in Examples 1 to 9, as shown in FIG. 1 (Example 1) and FIG. 5 (Example 7), particle bodies having a plurality of plate-like protrusions protruding outwards were formed, and it was confirmed that the dissolution time was short and the solubility was excellent. In addition, it was confirmed that the amounts of alkali and acid (excluding carbonic acid) were small, and the alkali and acid did not significantly affect the composition of the plating solution.

Furthermore, in Examples 8 and 9, since the stannous oxide powder was produced without using hydrochloric acid, the amount of chlorine was so small that it could not be detected. This method is most effective for producing stannous oxide powder with a small amount of chlorine.

Moreover, it was confirmed that in Examples 1 to 6, 8, and 9 in which 0.2 mass % or more of carbonic acid was contained, the solubility was further improved compared to Example 7 in which the amount of carbonic acid was less than 0.05 mass %.

INDUSTRIAL APPLICABILITY

According to the present invention, a stannous oxide powder which has a high dissolution rate into various acid solutions such as a plating solution and is particularly suitable as a Sn supply material to a plating solution, and a method for producing the stannous oxide powder can be provided.

REFERENCE SIGNS LIST

10 stannous oxide powder
11 plate-like protrusion

The invention claimed is:

1. A stannous oxide powder which is a particle body having a plurality of plate-like protrusions protruding outward, and has an average particle size in a range of 1 μm to 15 μm, wherein the amount of alkali is 10 ppm by mass or less, and the amount of acid excluding carbonic acid is 50 ppm by mass or less.

2. The stannous oxide powder according to claim 1, wherein a specific surface area of the stannous oxide powder is 1.0 m²/g or more.

3. The stannous oxide powder according to claim 1, wherein a bulk density of the stannous oxide powder is in a range of 1.5 g/cm³ or more and less than 2.0 g/cm³.

4. A stannous oxide powder which is a particle body having a plurality of plate-like protrusions protruding outward, and has an average particle size in a range of 1 μm to 15 μm, further comprising:
0.2 mass % or more of carbonic acid.

5. A method for producing a stannous oxide powder, wherein the stannous oxide powder is a particle body having a plurality of plate-like protrusions protruding outward, and has an average particle size in a range of 1 μm to 15 μm, the method comprising:
- an Sn ion-containing acid solution forming step of causing Sn ions to be contained in an acid solution, thereby obtaining an Sn ion-containing acid solution;
- a first neutralization step of adding an alkaline solution of any one or more selected from ammonium carbonate, ammonium bicarbonate, and ammonia water to the Sn ion-containing acid solution to maintain a pH of 3 to 6, thereby obtaining a Sn precipitate;
- a Sn precipitate separation step of separating the Sn precipitate from the Sn ion-containing acid solution;
- a Sn precipitate dispersion step of dispersing the separated Sn precipitate in a solvent; and
- a second neutralization step of maintaining the dispersion liquid of the Sn precipitate at 50° C. or lower, and adding an alkaline solution thereto for 1 hour or longer to achieve a pH of 6 to 12, thereby obtaining SnO from the Sn precipitate.

6. The stannous oxide powder according to claim 2, wherein a bulk density of the stannous oxide powder is in a range of 1.5 g/cm$^3$ or more and less than 2.0 g/cm$^3$.

7. The stannous oxide powder according to claim 4, wherein a specific surface area of the stannous oxide powder is 1.0 m$^2$/g or more.

8. The stannous oxide powder according to claim 4, wherein a bulk density of the stannous oxide powder is in a range of 1.5 g/cm$^3$ or more and less than 2.0 g/cm$^3$.

9. The stannous oxide powder according to claim 4, wherein the amount of alkali is 10 ppm by mass or less, and the amount of acid excluding carbonic acid is 50 ppm by mass or less.

10. The stannous oxide powder according to claim 4, wherein
a specific surface area of the stannous oxide powder is 1.0 m$^2$/g or more, and
a bulk density of the stannous oxide powder is in a range of 1.5 g/cm$^3$ or more and less than 2.0 g/cm$^3$.

11. The stannous oxide powder according to claim 4, wherein,
a specific surface area of the stannous oxide powder is 1.0 m$^2$/g or more, and
the amount of alkali is 10 ppm by mass or less, and the amount of acid excluding carbonic acid is 50 ppm by mass or less.

12. The stannous oxide powder according to claim 4, wherein
a bulk density of the stannous oxide powder is in a range of 1.5 g/cm$^3$ or more and less than 2.0 g/cm$^3$, and
the amount of alkali is 10 ppm by mass or less, and the amount of acid excluding carbonic acid is 50 ppm by mass or less.

13. A method for producing the stannous oxide powder according to claim 1, the method comprising:
- an Sn ion-containing acid solution forming step of causing Sn ions to be contained in an acid solution, thereby obtaining an Sn ion-containing acid solution;
- a first neutralization step of adding an alkaline solution of any one or more selected from ammonium carbonate, ammonium bicarbonate, and ammonia water to the Sn ion-containing acid solution to maintain a pH of 3 to 6, thereby obtaining a Sn precipitate;
- a Sn precipitate separation step of separating the Sn precipitate from the Sn ion-containing acid solution;
- a Sn precipitate dispersion step of dispersing the separated Sn precipitate in a solvent; and
- a second neutralization step of maintaining the dispersion liquid of the Sn precipitate at 50° C. or lower, and adding an alkaline solution thereto for 1 hour or longer to achieve a pH of 6 to 12, thereby obtaining SnO from the Sn precipitate.

14. A method for producing the stannous oxide powder according to claim 2, the method comprising:
- an Sn ion-containing acid solution forming step of causing Sn ions to be contained in an acid solution, thereby obtaining an Sn ion-containing acid solution;
- a first neutralization step of adding an alkaline solution of any one or more selected from ammonium carbonate, ammonium bicarbonate, and ammonia water to the Sn ion-containing acid solution to maintain a pH of 3 to 6, thereby obtaining a Sn precipitate;
- a Sn precipitate separation step of separating the Sn precipitate from the Sn ion-containing acid solution;
- a Sn precipitate dispersion step of dispersing the separated Sn precipitate in a solvent; and
- a second neutralization step of maintaining the dispersion liquid of the Sn precipitate at 50° C. or lower, and adding an alkaline solution thereto for 1 hour or longer to achieve a pH of 6 to 12, thereby obtaining SnO from the Sn precipitate.

15. A method for producing the stannous oxide powder according to claim 3, the method comprising:
- an Sn ion-containing acid solution forming step of causing Sn ions to be contained in an acid solution, thereby obtaining an Sn ion-containing acid solution;
- a first neutralization step of adding an alkaline solution of any one or more selected from ammonium carbonate, ammonium bicarbonate, and ammonia water to the Sn ion-containing acid solution to maintain a pH of 3 to 6, thereby obtaining a Sn precipitate;
- a Sn precipitate separation step of separating the Sn precipitate from the Sn ion-containing acid solution;
- a Sn precipitate dispersion step of dispersing the separated Sn precipitate in a solvent; and
- a second neutralization step of maintaining the dispersion liquid of the Sn precipitate at 50° C. or lower, and adding an alkaline solution thereto for 1 hour or longer to achieve a pH of 6 to 12, thereby obtaining SnO from the Sn precipitate.

16. A method for producing the stannous oxide powder according to claim 4, the method comprising:
- an Sn ion-containing acid solution forming step of causing Sn ions to be contained in an acid solution, thereby obtaining an Sn ion-containing acid solution;
- a first neutralization step of adding an alkaline solution of any one or more selected from ammonium carbonate, ammonium bicarbonate, and ammonia water to the Sn ion-containing acid solution to maintain a pH of 3 to 6, thereby obtaining a Sn precipitate;
- a Sn precipitate separation step of separating the Sn precipitate from the Sn ion-containing acid solution;
- a Sn precipitate dispersion step of dispersing the separated Sn precipitate in a solvent; and
- a second neutralization step of maintaining the dispersion liquid of the Sn precipitate at 50° C. or lower, and adding an alkaline solution thereto for 1 hour or longer to achieve a pH of 6 to 12, thereby obtaining SnO from the Sn precipitate.

* * * * *